US010117795B2

(12) United States Patent
De Rossi

(10) Patent No.: US 10,117,795 B2
(45) Date of Patent: Nov. 6, 2018

(54) WHEELED LOAD TRANSFER DEVICE WITH AUTOMATICALLY-FOLDABLE BARRIERS

(71) Applicant: Gabriele De Rossi, Sona (IT)

(72) Inventor: Gabriele De Rossi, Sona (IT)

( * ) Notice: Subject to any disclaimer, the term of this patent is extended or adjusted under 35 U.S.C. 154(b) by 6 days.

(21) Appl. No.: 15/389,025

(22) Filed: Dec. 22, 2016

(65) Prior Publication Data

US 2017/0196741 A1 Jul. 13, 2017

(30) Foreign Application Priority Data

Jan. 7, 2016 (IT) ........................ 102016000000639

(51) Int. Cl.
*A61G 3/02* (2006.01)
*A61G 3/06* (2006.01)
*B60P 1/44* (2006.01)

(52) U.S. Cl.
CPC ............... *A61G 3/062* (2013.01); *A61G 3/02* (2013.01)

(58) Field of Classification Search
CPC .............................. A61G 3/062; B60P 1/4414
USPC ........ 414/470, 540, 545, 546, 556, 917, 921
See application file for complete search history.

(56) References Cited

U.S. PATENT DOCUMENTS 5,401,135 A * 3/1995 Stoen ........................ B60P 1/44 414/546
5,672,041 A * 9/1997 Ringdahl ................. A61G 3/06 414/540
6,082,957 A * 7/2000 Kupka, Jr. ............... A61G 3/06 187/267
6,086,314 A * 7/2000 Savaria .................... A61G 3/06 414/546
6,305,897 B1 * 10/2001 Budd ......................... B60P 1/02 414/540
6,379,102 B1 * 4/2002 Kameda ................... A61G 3/06 414/546
7,467,917 B2 * 12/2008 Fisher ................... B60P 1/4442 414/546
8,132,997 B2 * 3/2012 Reuille ................. B60P 1/4421 224/537
8,998,558 B2 * 4/2015 Kitchin .................... A61G 3/06 280/6.152

(Continued)

FOREIGN PATENT DOCUMENTS

DE 202012000642 2/2012

*Primary Examiner* — Douglas A Hess
(74) *Attorney, Agent, or Firm* — Shalom Wertsberger; Saltamar Innovations

(57) ABSTRACT

A transfer device for loading/unloading of a cargo such as wheelchair from a structure such as a vehicle the device having a platform movable from a deposit position at the level of the ground level to an access position at the floor level keeping the platform substantially horizontal. The platform is provided with a front safety barrier rotatable to serve as a ramp when the platform is at ground level, and with side safety barriers each substantially constituted by an articulated quadrilateral, such that when the platform is at the ground level, the side safety barriers fold down by kinematic mechanisms while preferably corresponding side ramps are made available. This arrangement allows transition of the wheelchair from/to the ground from any side of the platform, by virtue of the automatic folding of both the front and side barriers and the simultaneous presentation of the corresponding ramps.

20 Claims, 9 Drawing Sheets

(56) References Cited

U.S. PATENT DOCUMENTS

| | | | |
|---|---|---|---|
| 9,603,760 B2 * | 3/2017 | Beck | A61G 3/062 |
| 2006/0255640 A1 * | 11/2006 | Kusanagi et al. | |
| 2007/0224025 A1 | 9/2007 | Ablabutyan et al. | |

* cited by examiner

SEZ. A-A

SEZ. B-B

WHEELED LOAD TRANSFER DEVICE WITH AUTOMATICALLY-FOLDABLE BARRIERS

FIELD OF THE INVENTION

The invention relates generally to a device for handling, loading, and unloading of materials.

BACKGROUND OF THE INVENTION

An object of the present invention is a device for facilitating loading and unloading, getting out of/into a vehicle or fixed structure, of any material such as material loaded on pallets or various casings; even more in particular to wheeled loads like carts or the like.

Another object of the present invention is a device for facilitating access and egress, and getting out of/into a vehicle or a fixed structure, of a person seated in a wheelchair.

The person may be a disable, invalid, patient in rehabilitation or any person requiring temporarily or permanently, the aid of a wheelchair.

The problem of allowing the transport of people that are confined to a wheelchair due to limited motor skills is well known and many mechanisms have been proposed in order to ease embarking and disembarking such person from a vehicle.

However, known solutions are mainly designed for public transportation and do not adapt well to smaller private vehicles, where the space available is much smaller and the structure for lifting and lowering of a person in a wheelchair from the vehicle must be less bulky. Such device shall be referred to in these specifications as a ‘transfer device’.

This need for smaller overall dimensions is often met at the expense of the robustness of the structure which as a result suffers from a wobbly motion during operation.

It should also be considered that the public transportation is generally intended for travelling on roads with a smooth and flat surface therefore it is not very important that the transfer device is suitable for unloading on an uneven ground or confined spaces.

In particular, the access and egress of the wheelchair from the platform that lifts it is envisaged at only one of the three sides; usually on the rear side. The device is provided with a mobile safety barrier that keeps vertical with the platform while it is detached from the ground, the barrier tilts to form an access ramp as it comes into contact with the ground. Two fixed safety barriers are provided along the other two sides.

This mandatory entry direction is not a drawback for public transportation vehicles parking in a mandatory position at the sides of the road, but severely limits the flexibility of use of the transfer device in a private vehicle that may need to park in confined spaces, where the access and egress from the platform may be appropriate or possible from different positions.

One object of the present invention is to eliminate at least in part such drawbacks of the known transfer devices.

SUMMARY OF THE INVENTION

An object of certain embodiments the present invention is to provide, in a transfer device, safety barriers that lower on all the three free sides of the platform when it comes into contact with the ground.

Certain features of the present invention provide, in a transfer device, the formation of access ramps not only on one but on all the three free sides of the platform when the safety barriers lowers in contact with the ground.

At least some variants of the present invention provide a transfer device suitable for the installation at least on some types of private vehicles.

Certain embodiments provide a transfer device suitable to allow the access and egress of the wheelchair at a side of the vehicle and or along the vehicle.

A further object, at least of some variants of the present invention, is to provide a transfer device utilizing kinematic mechanisms enabling transfer of loads of at least 1000 kg.

A further object, at least of some variants of the present invention, is to provide a transfer device suitable for the lifting of materials.

A further object, at least of some variants of the present invention, is to provide a device for the transfer of materials from one fixed structure to another having planes on different levels.

SHORT DESCRIPTION OF DRAWINGS

The summary above, and the following detailed description will be better understood in view of the enclosed drawings which depict details of preferred embodiments. It should however be noted that the invention is not limited to the precise arrangement shown in the drawings and that the drawings are provided merely as examples. In order to facilitate understanding of different aspects of the invention, it is noted that the drawings or portions thereof may not be drawn to scale. The drawings are substantially but not necessarily to scale (unless otherwise specified) and show possible details but that represent only some of the possible patent choices within the reach of the men skilled in the art.

Figure 14A:
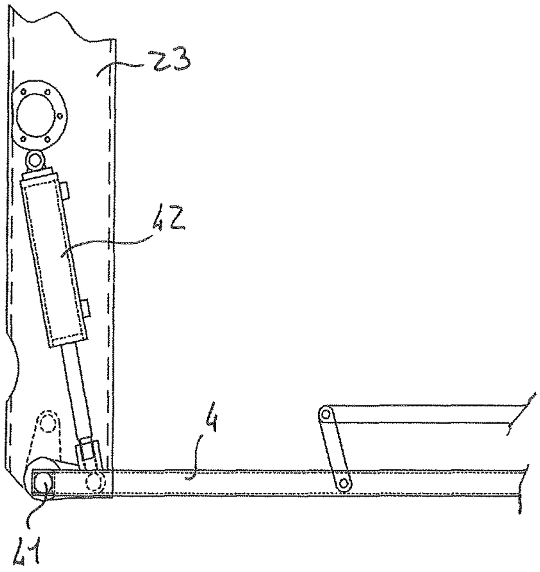
Figure 14B:
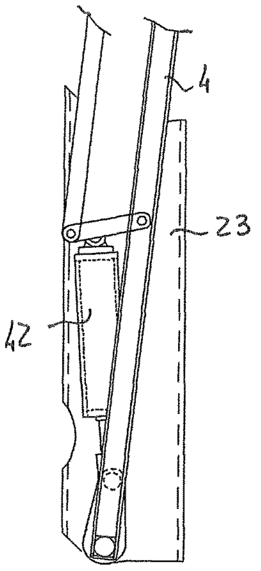
Figure 16:
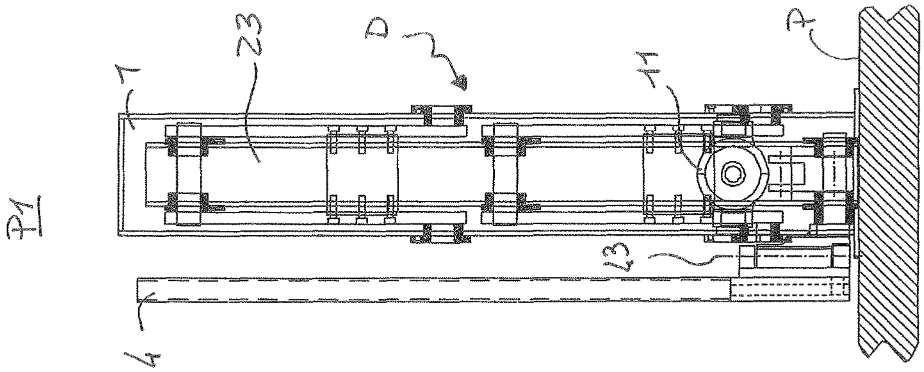
Figure 15:
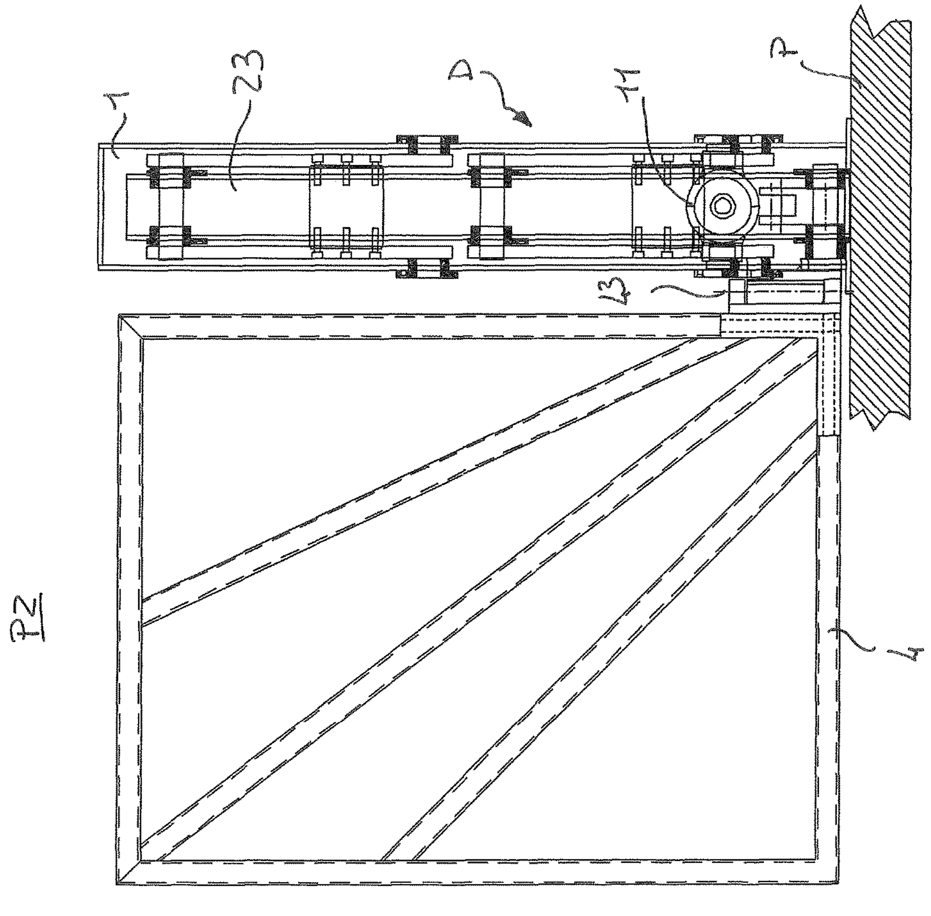

FIG. 14*a* shows in a side view the coupling between said platform and a first support element, the platform shown in the access position;

FIG. 14*b* shows in a side view the coupling between said platform and a first support element, the platform shown in the pre-operating position;

FIG. 15 shows a side section view of the transfer device in the pre-operating position;

FIG. 16 shows a section view of the transfer device in a possible closed/rest configuration in a position herein referred to as folded.

Figure 3:
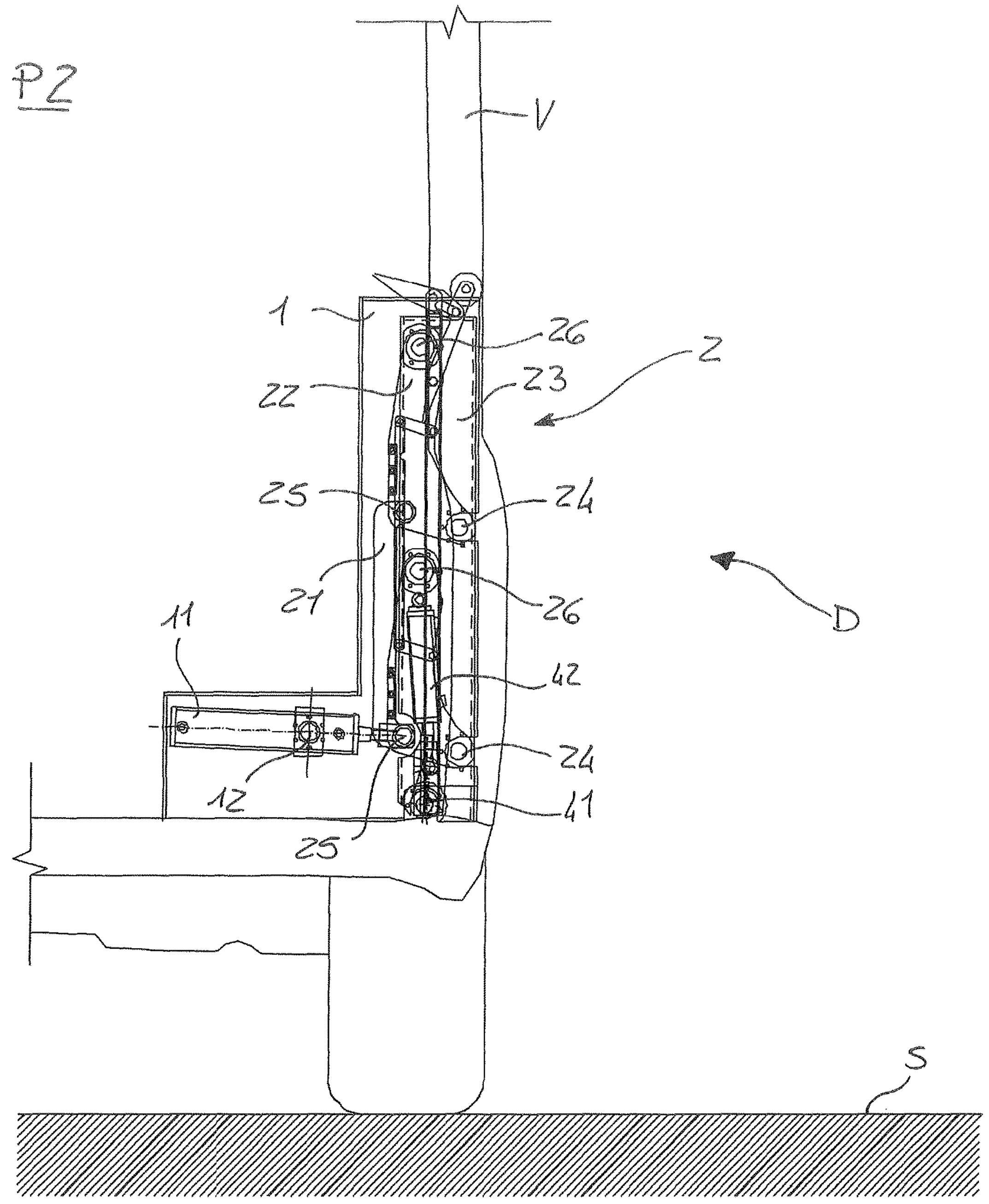
FIG. 3 shows, from the rear view of the vehicle, the transfer device in the pre-operating position.
Figure 3A:
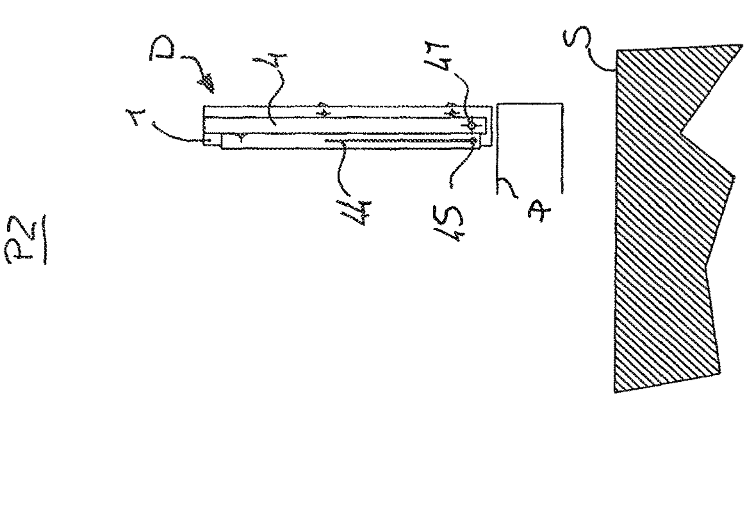
Figure 4A:
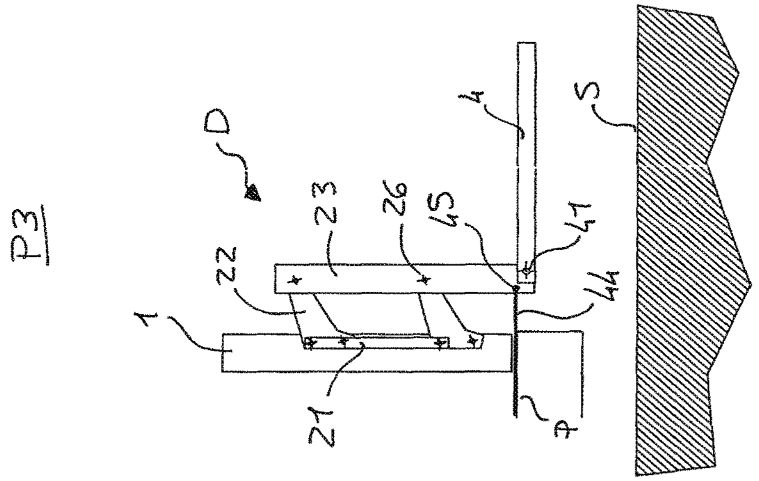
FIG. 4 shows, from the rear view of the vehicle, the transfer device in a position herein referred to as access.
Figure 5A:
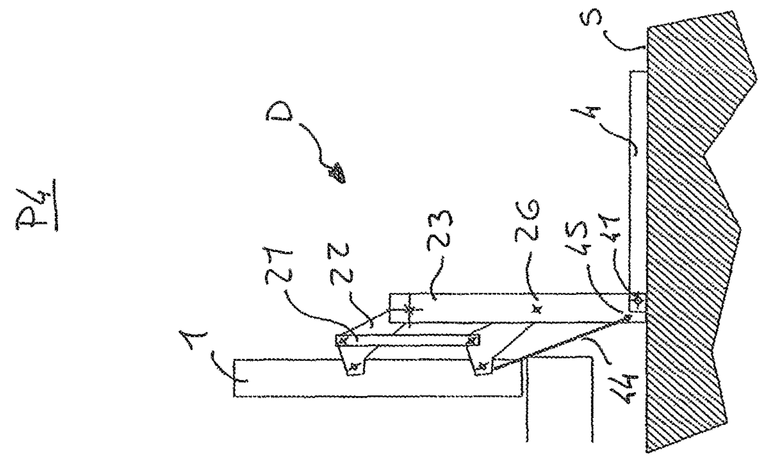
FIG. 5 shows, from the rear view of the vehicle, the transfer device with the platform at the level of the ground in a position herein referred to as deposited.
Figure 4:
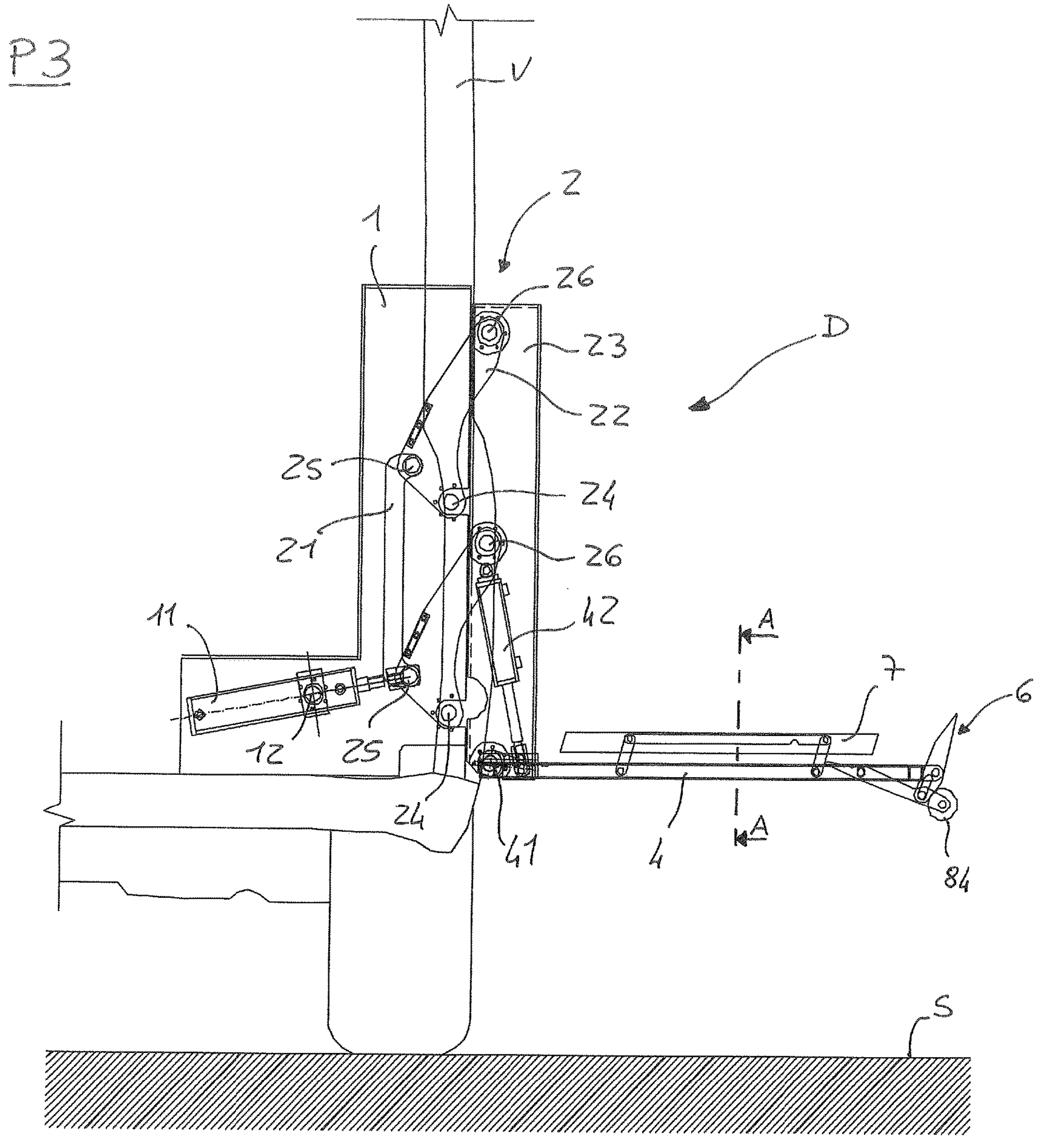
Figure 5:
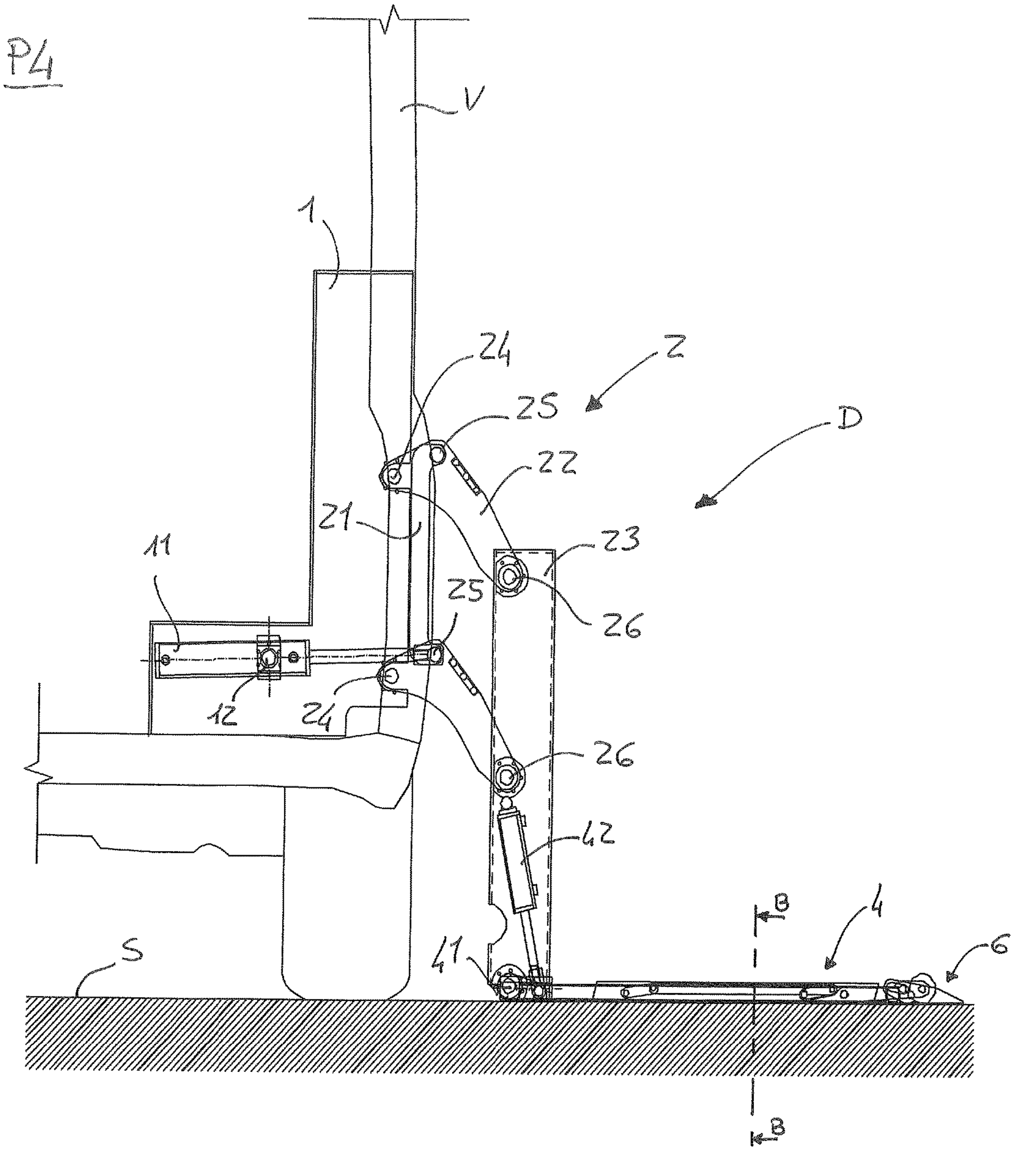

FIG. 3A, FIG. 4A, and FIG. 5A schematically show, according to the views of the FIGS. 3, 4 and 5, respectively, the positions taken by a tilting bridge.

DETAILED DESCRIPTION

The present invention shall now be described, without any limiting intent, to the particular case of a device for the access and egress, getting out of/into a vehicle by a person seated in a wheelchair.

In these specifications, the term "axis of the vehicle" shall refer to the longitudinal axis of the vehicle.

Figure 2:
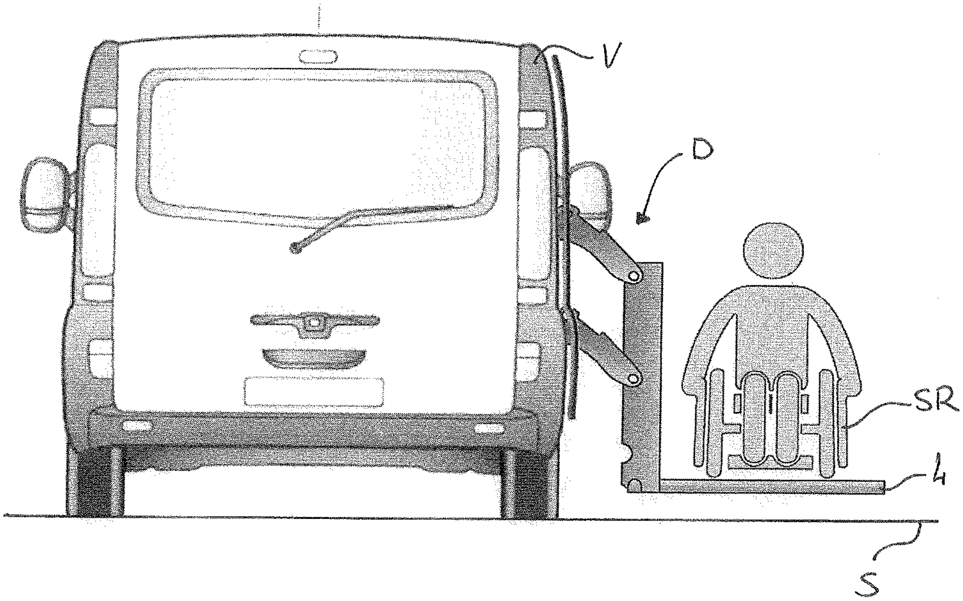
FIG. 2 shows, from the rear view, the same vehicle and the person seated in the wheelchair deposited on the ground to the side of the vehicle.

The terms front/rear and right/left refer to the positions of the objects as shown; the clockwise/anticlockwise directions refer to positions and movements of the objects as shown in FIG. 2.

The device employs articulated quadrilaterals, where articulated quadrilateral means a kinematic chain consisting of four rigid members, each pair thereof connected by hinges, spherical joints, or articulation pins; the axes of the hinges may be parallel to each other (flat articulated quadrilateral) or concurrent in one point (spherical joint or articulation pins articulated quadrilateral).

Said articulated parallelogram is a particular articulated quadrilateral in which the distance among the axes of the articulations of the pairs of opposed rods is the same; the result is that the opposed rods are always parallel to each other during rotation of the same.

Some embodiments of the invention makes use of flat articulated quadrilaterals.

Figure 1:
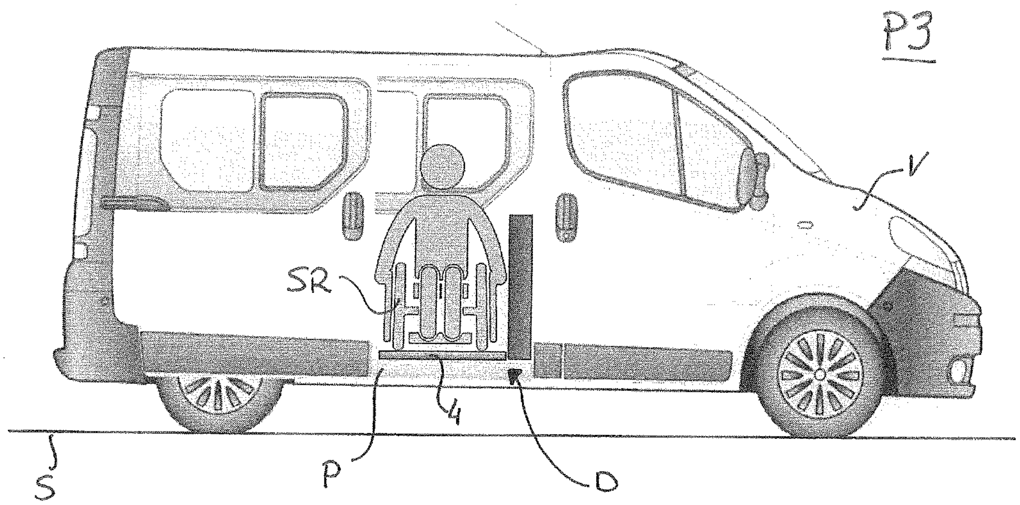
FIG. 1 shows the side of a vehicles accommodating, at the vehicle rear compartment, a person seated in a wheelchair.

FIG. 1 shows a vehicle V having a floor P. A wheelchair SR is shown at the rear compartment of the vehicle; the transfer device D according to an embodiment of the invention is also shown.

In FIG. 2 the wheelchair SR rests on the platform 4 of the transfer device D.

The transfer device D according to the invention provides three basic positions:

- a pre-operating position P2 with platform 4 vertical and parallel to the axis of the vehicle V;
- an access position P3 with platform 4 horizontal at the level of the floor P of the vehicle V, which allows to get access and/or egress of the vehicle V;
- a deposit position P4 with platform 4 horizontal at the level of the ground S.

Usefully, the transfer device D may provide a further position consisting in

- a folded position P1 with platform 4 vertical and orthogonal to the axis of the vehicle V, close to the backrest of the front seat.

In operating conditions, the platform 4 moves between the deposit position P4 (FIG. 5), in which it allows the wheelchair SR in/out of the platform 4 at the level of the ground S, and the access position P3 (FIG. 4), which allows the wheelchair SR in/out of the vehicle V.

According to a preferred variant of the invention, with reference to FIGS. 1 to 16, the transfer device D provides a support structure 1 (hereinafter housing 1) whereto a shoulder 23 is translatably constrained. Shoulder 23 and housing 1 form edges of an articulated quadrilateral 2 the two pairs thereof are formed by the two crank arms 22 (hereinafter arms 22), the housing 1 and shoulder 23.

The platform 4 whereon the wheelchair SR is positioned during the loading and unloading operations is constrained to the shoulder 23.

The four articulations of the articulated quadrilateral 2 consist in a pair of support pins 24 that rotatably constrain said arms 22 to said housing 1, and a pair of first articulations 26 that rotatably constrain said arms 22 to said shoulder 23.

The platform 4 is rotatably constrained to the shoulder 23 through a first hinge 41 that has axis of rotation orthogonal to the displacement plane of the articulated quadrilateral 2.

As regards the opening/closing of the platform 4, it is carried out through a linear actuator 42, e.g. electrically actuatable, fixed to the shoulder 23 and suitably connected to the said platform 4 (FIGS. 14*a*, 14*b*).

In a optional embodiment variant, said linear actuator 42 may comprise a hydraulic piston, and the exit and the return of the rod of said hydraulic piston, through the first hinge 41, carry out the opening and the closing, respectively, of the said platform 4.

As already mentioned, the transfer device D, allows the following positions of the platform 4 relative to the vehicle:

- the possible folded position P1 (FIG. 16);
- the pre-operating position P2 (FIG. 3, FIG. 15) with:
  - shoulder 23 inside the housing 1;
  - vertical platform 4, disposed parallel to the axis of the vehicle V and close to the shoulder 23;
- the access position P3 (FIG. 4) with:
  - shoulder 23 outside the housing 1;
  - horizontal platform 4 at the height of the floor P of the vehicle V;
- the deposit position P4 (FIG. 5) with:
  - shoulder 23 further stretched externally to the vehicle;
  - horizontal platform 4 in contact with the ground S.

From the pre-operating position P2 to the access position P3 achieved by rotation of the arms 22 by an angle the amplitude whereof, preferably, is substantially symmetrical relative to the vertical and in the middle of which the support pins 25 reach the maximum distance from the ground S.

With reference to FIGS. 3.A, 4.A, 5.A, during the transition from the pre-operating position P2 to the access position P3, a tilting bridge 44, which initially, as explained below, may be located both in horizontal and vertical set-up, rotates about a horizontal hinge 45 (which constrains it to the platform 4 or to the shoulder 23) to be positioned in a substantially horizontal orientation in access position P3 to then incline on the side of the vehicle V during the transition from the access position P3 to the deposit position P4.

Such tilting bridge 44 is a an optional manner to establish a continuity between outer edge of the floor P and inner edge of the platform 4 if, in access position P3, the gap between those edges is too long to be easily crossed by the wheels of the wheelchair SR.

If the folded position P1 is not considered, such tilting bridge 44 may take naturally, by gravity, the correct orientation in every position of the platform 4. On the other hand, if the folded position P1 is also considered, before position P1 is reached, the tilting bridge is rotated to a vertical orientation manually or, more conveniently, through actuators e.g. linear or rotary (not shown in the figures for simplicity of description since their possible embodiments are within the grasp of the skilled in the art).

Optionally, tilting bridge 44 may be kept in vertical orientation making it adhere to the platform 4 by a magnet.

The articulated quadrilateral 2 is moved by a first linear actuator 11, e.g. in the form of hydraulic piston 11 or of an equivalent electric linear actuator which, rotatable about the hinge 12 that constrains it to the housing 1, directly or indirectly imparts a rotation to the arms 22.

To this end, preferably by a second articulations 25, a return rod 21 is rotatably constrained to the arms 22 to form a further articulated quadrilateral the four articulations whereof are the said pair of support pins 24 and second articulations 25.

Said further articulated quadrilateral is not necessary from the kinematic point of view but highly preferred because it provides sturdiness and better distribution of the stresses on the structure.

Of course, if in addition to the articulated quadrilateral 2 this further articulated quadrilateral is present, both must be articulated parallelograms.

The first linear actuator 11, instead of acting directly on one of the arms 22, as shown in the accompanying figures, may act on said return rod 21 which in turn transmits the thrust to both arms 22 in a better balanced manner.

In order to arrive at the optional folded position P1 (see FIG. 16), the platform 4, thanks to a second hinge 43 provided between the platform 4 and the first hinge 41 that constrains it to the shoulder 23, may rotate, even if only by manual action, to a position still vertical but substantially parallel to the backrest of the front seat of the vehicle.

Such option has at least the advantage that the exit through the door used by the platform 4 with transfer device D in non-operating conditions is provided.

As already said describing the prior art, the current platforms are provided with a plurality of safety barriers that are structural elements installed mainly to act as a block and obstacle to an accidental movement of the wheelchair SR during the lifting or lowering maneuvers of said platform.

In fact, the wheelchair SR might accidentally move, perhaps due to vibrations or to an incorrect maneuver by the user, toward the edge of the platform with an obvious danger for the user, who could fall from the platform. The safety barriers prevent this kind of situations and preserve the person from falls due to undesired movements of the wheelchair SR.

As already stated, current technology platforms provide a movable front safety barrier, i.e. able to rotate/tilt to form an access ramp when it reaches the ground, while the side safety barriers are fixed, with the consequent problems previously described.

Figure 6:
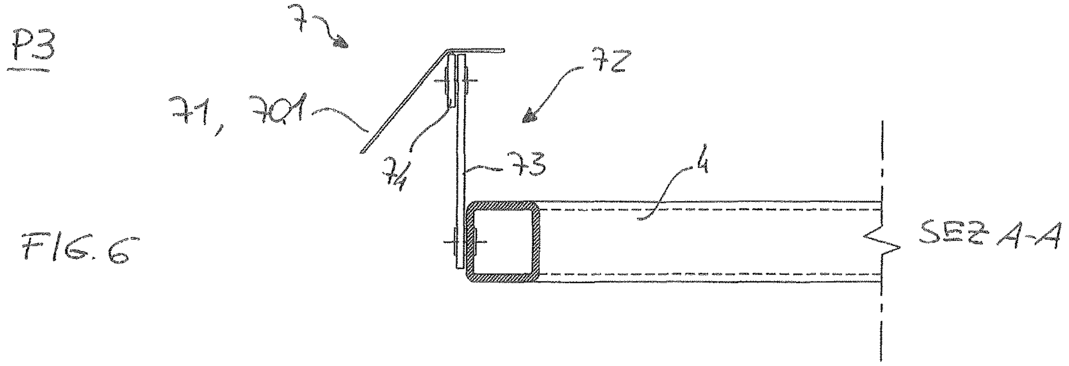
FIG. 6 shows, in an cross-section showing a detail of the side barriers of the platform shown in FIG. 4.
Figure 8:
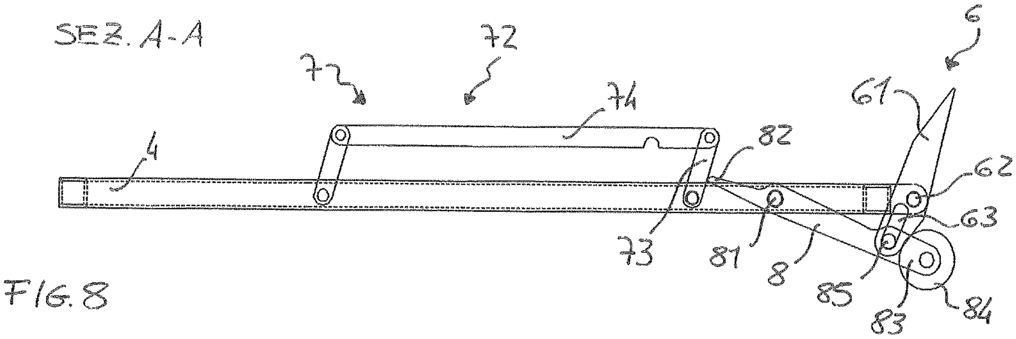
FIG. 8 shows, according to a first possible embodiment, a side view of the system for the lifting and lowering of the side barriers in locked position, that is with raised barriers.
Figure 9:
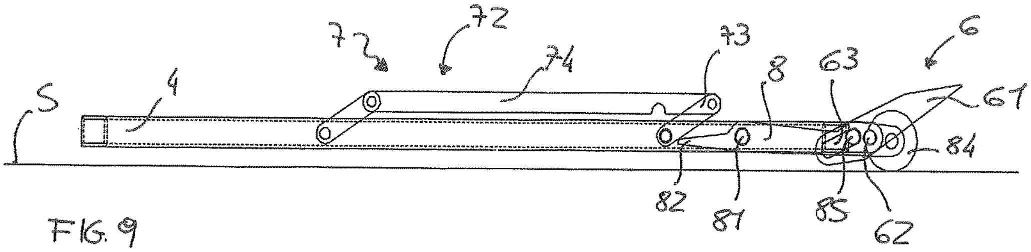
FIG. 9 shows a side view of the system for the lifting and lowering of the side barriers of FIG. 8 in an intermediate position, that is with partially raised barriers.
Figure 10:
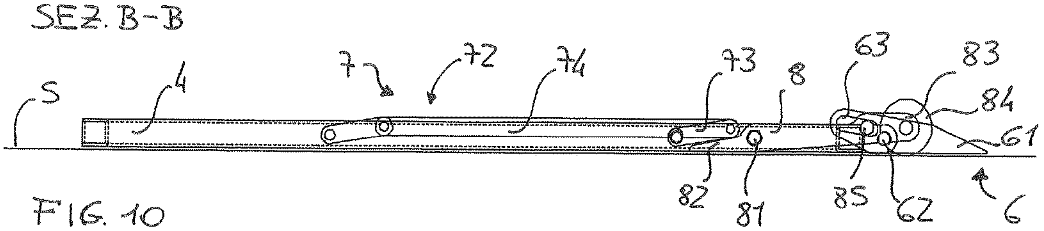
FIG. 10 shows a side view of the system for the lifting and lowering of the side barriers of FIG. 8 in unlocked position, that is with lowered barriers.
Figure 11:
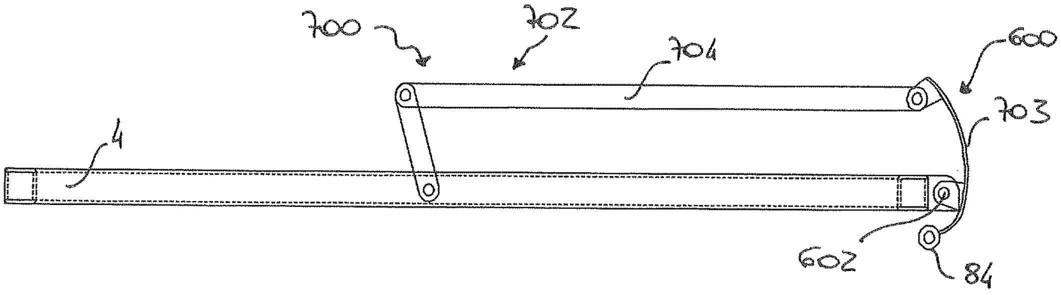
FIG. 11 shows, according to a second possible embodiment variant, a side view of the system for the lifting and lowering of the side barriers in locked position.
Figure 12:
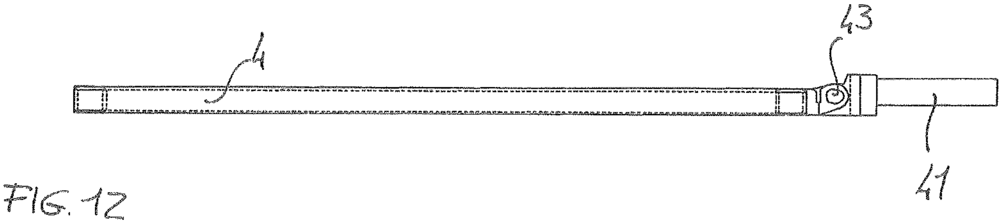
FIG. 12 shows a front view of the platform according to a possible variant of the present invention.
Figure 13:
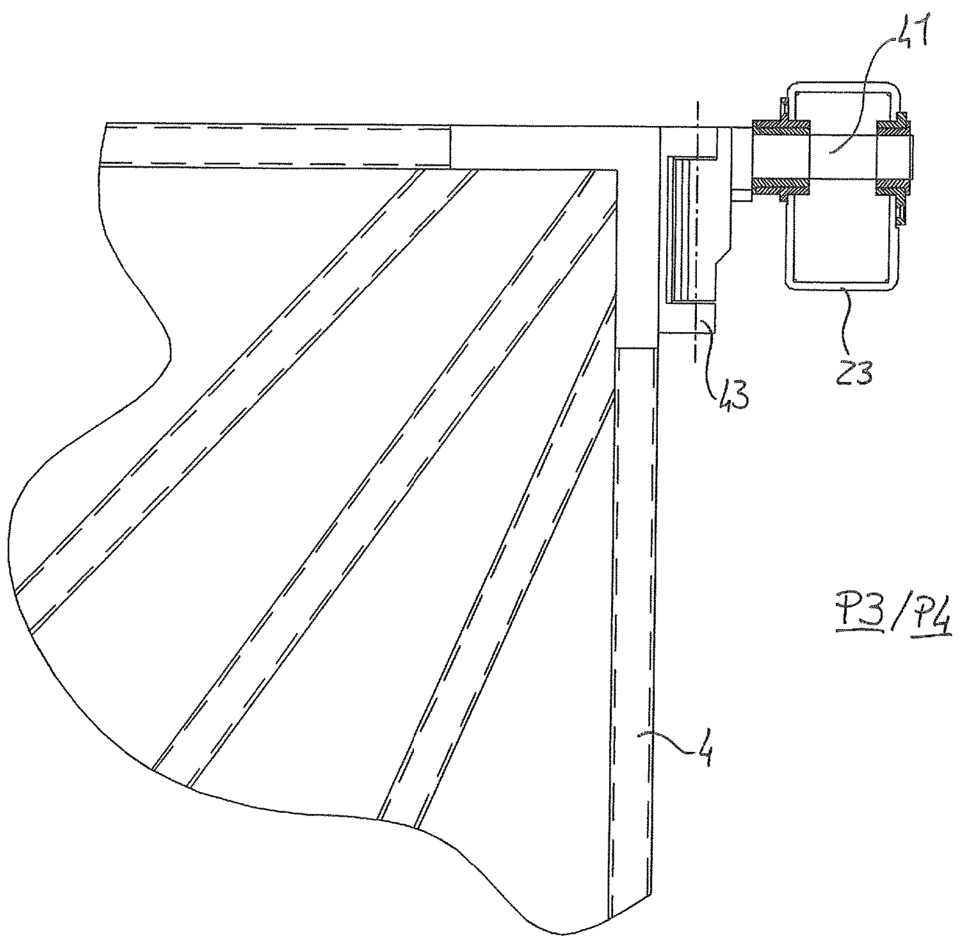
FIG. 13 shows from above the coupling between said platform and a first support element.

The transfer device D according to some aspects of the present invention provides suitable kinematic mechanisms comprising the elements 8, 85, 63, 82, 83, 84, 73, 72 shown in FIGS. 8-10 or the elements 602, 84, 600, 702, 703, 701, 704 of FIGS. 6 and 11 or still others that once the platform 4 is close to the ground S, allow the complete lowering of front and side safety barriers, and at the same time make ascent/descent ramps from/to the platform 4 to/from the ground S available coming to a set-up of the platform 4 herein referred to as unlocked.

As the platform 4 is detached from the ground S, the already said kinematic mechanisms of FIGS. 8-10 or FIG. 11 or others raise the barriers and make the ramps inaccessible bringing the platform 4 back to a set-up herein referred to as blocked.

According to the invention, with ref. to FIGS. 8-11, the front barrier:

- substantially consists of a plate usable as ramp,
- is rotatably constrained according to a horizontal axis to the platform 4 so that from a substantially vertical set-up where it serves as a barrier may rotate to a substantially horizontal set-up to serve as a ramp;
- keeps the set-up substantially vertical by gravity and/or aid of elastic forces such as springs, elastic cord, and the like, and rotates to the substantially horizontal set-up by the effect of forces that are generated by the contact of the platform 4 with the ground S and that counteract the gravity and/or elastic forces;

each side safety barrier:

- comprises an articulated quadrilateral (not necessarily an articulated parallelogram) of which one arm consists of the corresponding side edge of the platform 4 while the opposite arm constitutes a side railing of the barrier,
- includes the side ramp that is constrained to the railing of the barrier or is a substantial part thereof;

a slider capable of sliding on the ground S (in particular a wheel) are connected:

- with first kinematic mechanisms to the front safety barrier to fold/raise it when the platform descends/raises;
- with seconds kinematic mechanisms, which very preferably at least partially coincides with the first kinematic mechanisms, to the side safety barriers and actuate them to fold/raise the corresponding railings when they are pressed/detached against/from the ground S by the platform 4 that descends/raises;

such kinematic mechanisms being therefore adapted to bring the platform 4 from locked to unlocked set-up and vice versa when the said slider(s) are pressed/detached against/from the ground S by the platform 4 that descends/raises.

By way of an example two possible embodiments of such a mechanism and kinematic chain are provided.

According to the first embodiment, and with reference to FIGS. 4 to 10, in particular from FIG. 6 to FIG. 10, the transfer device D provides side barriers 7 each comprising a side ramp 71 and an articulated quadrilateral 72.

The front arm 73 of the articulated quadrilateral 72 is capable of rotating from a substantially vertical to a substantially horizontal orientation by the action thereon of a corresponding rocker plate 8 as described below.

In FIGS. 8, 9 and 10 in order to provide a better understanding of the operation of the parts, the side ramp 71 that is suitably fixed to said articulated quadrilateral 72 (see FIGS. 6 and 7) has not been shown.

A front barrier 6 is suitably hinged to the front edge of the platform 4 with horizontal axis hinges 62 that allow it to rotate from a vertical position (kept even just by gravity or thanks to elastic force member, not shown) where it serves as an actual barrier 6, to a horizontal position where it serves as a front ramp 6.

In the front of the sides of the platform 4 two rocker plates 8 are hinged, by horizontal axis hinges 81, each of which has:

- a rear end 82 suitably shaped to cooperate with the front arm 73 of the articulated quadrilateral 72
- and a front end 83 carrying a slider 84 capable of sliding/rotating against the ground S such as a shoe 84 or, preferably a hinged wheel 84.
- a linkage 85-63 with a corresponding vertical side 61 of the said front barrier 6 so as to impart a clockwise torque to the same vertical side 61 when moving from locked to unlocked set-up and vice versa in the anticlockwise direction moving from unlocked to locked.

In particular the linkage 85-63 may consist in a sliding coupling that is provided with a pin 85 on the rocker plate 8 that slidingly engages within a guide 63 obtained and defined on the vertical side 61 of said front barrier 6 and capable of allowing the sliding of the pin 85 for a predetermined portion according to a direction that passes above the axis of the horizontal hinges 62.

Said guide 63 preferably comprises a slot 63.

In any intermediate position between the access position P3 to those close to the deposit position P4 which do not allow contact between the slider 84 and the ground S, even simply by gravity (or possibly with the help of elastic force member), the rocker plates 8 have the front end 83 stretched towards the ground S by as much as allowed by the linkage 85-63.

Accordingly, the rear ends 82 stretch farthest from the ground S and, pressing against the front arms 73 of the articulated quadrilaterals 70, keep them in the most upright position as allowed by the kinematic mechanism, and then the articulated quadrilaterals 72 keep the side barriers 7 raised.

When the position of the transfer device D is sufficiently close to or coincides with the deposit position P4, the slider 84 comes into contact with the ground S and, as a consequence, the pins 85 press for the tilting towards the outside of the front barrier 6 that becomes a ramp 6 while the rear ends 82 are lowered allowing the forward inclination of the front arms 73 of the articulated quadrilaterals 70 such that the side barriers 7 fold back on themselves and the side ramps 71 descend into operating position.

Shapes and relative positions of at least the rocker plate 8, pin 85, guide 63, rear end 82, front end 83, slider 84, front arms 73 elements of the articulated quadrilaterals 70 are shown at least in FIGS. 8, 9 and 10 in right proportions of an exemplary embodiment.

FIG. 11 shows a second embodiment variant of the controls and portions for lowering and lifting of the side barriers.

The front barrier 600, is hinged to the front edge of the platform 4 by horizontal axis hinges 602 and, in the locked set-up, is kept vertical by the effect of gravity and/or with the aid of elastic force member (e.g. torsion springs not shown coaxial to the horizontal axis hinges 602).

The already disclosed slider 84 (shown as wheels 84) are hinged directly to the lower edge of the front barrier 600.

Each side barrier 700 comprises an articulated quadrilateral 702 the front arm 703 whereof consists of the corresponding end of the front barrier 600 and a side ramp 701 constrained, fixed or rotatable, to the upper arm 704.

Lowering the platform 4 towards the ground S, the barrier is transitioned to the unlocked set-up as the front barrier 600 rotates about the hinge 602 clockwise, to assume the function of front access ramp; turning this way the front barrier 600 closes the articulated quadrilateral 702 that causes the side ramp 701, constrained to the upper arm 704, to descend, making it available for access and egress of a wheelchair or the like from the platform 4 by its side edges.

Going back up the platform 4, it goes back to the locked set-up for the reverse movement of the elements just described by the effect of gravity and/or elastic force member.

Figure 7:
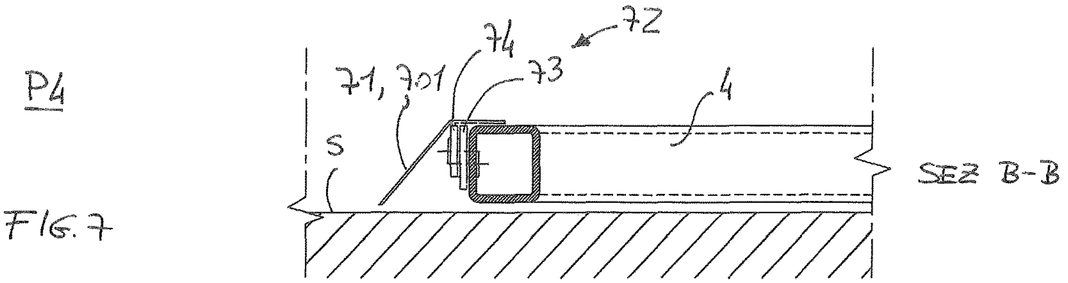
FIG. 7 shows a cross-section of a detail of the side barriers of the platform shown in FIG. 5.

Advantageously, although not shown in FIGS. 6 and 7, said side ramps 71 or 701 may be installed pivoting relative to the articulated quadrilateral 72 or 702 to which then they are constrained by parallel axis hinges to the upper arms 74, 704, so as to ensure the safety for users and reduce the overall dimensions of the transfer device D when closed.

In FIGS. 12, 13, 14*a* and 14*b* the coupling among the platform 4, the shoulder 23 and the housing 1 is visible.

The platform 4 is rotatably constrained to the shoulder 23 by a first hinge 41 that has axis of rotation orthogonal relative to the displacement plane of the articulated parallelogram 2.

Said first hinge 41 allows rotating the platform 4 so as to allow switching from the pre-operating position P2 (FIG. 3, FIG. 15) to the intermediate position P3 (FIG. 4) and vice versa.

Optionally said platform 4 may be provided with a second hinge 43 arranged between the platform 4 and the first hinge 41 that constrains it to the shoulder 23.

Said second hinge 43 allows rotating the platform 4 from the pre-operating position P2 (FIG. 3, FIG. 15) to the folded position P1 (FIG. 16) and vice versa, so that said platform 4 is arranged vertically and substantially parallel to the backrest of the front seat.

The folded position P1 reduces the overall dimensions of the transfer device D when not used.

The first hinge 41, used to bring the platform 4 from the pre-operating position P2 to the access position P3 may also be used when the platform 4 reaches the deposit position P4 to better adapt the same to the lying of the ground S that may be not exactly the same.

Also the second hinge 43, when provided to rotate the platform 4 from the pre-operating position P2 to the folded position P1, may be used in deposit position P4 to adapt the lying of the platform to that of the ground S. Therefore the lying of the platform 4 may be adapted exactly to that of the ground S being able to rotate about two axes orthogonal to each other.

Many variants are possible without departing from the scopes of the invention, as is exemplified below by way of non-limiting examples.

The main advantage of the articulated quadrilateral 2, used in the description for the movement of the platform 4 from the access position P3 to the deposit position P4, is the minimum overall dimensions when in non-operating positions but it is not essential for the purposes of the invention and may be replaced by any other kinematic mechanism at least adapted to move the platform 4 from one to the other of such positions P3 and P4. For example the shoulder 23 that supports the platform 4 may be moved away from the floor P in horizontal direction by corresponding horizontal guides and descend towards the ground S from the floor P by corresponding vertical guides.

According to such embodiment the platform 4 may be moved to even greater distances from the floor P than allowed by the articulated quadrilateral 2.

Such mechanism with horizontal and vertical guides may be particularly useful when floor P and ground S are the surfaces of a fixed structure (for example, upper and lower floors of a staircase) between which the wheelchair SR or another load are to be moved.

The invention, described with reference to a vehicle V and a wheelchair SR, usefully applies to all of the transfer devices D from a floor P, even belonging to a fixed structure V, to a ground S located at a different level from that of floor P.

The invention is useful for the transfer of any load, in particular a wheeled load, and even more in particular a wheelchair SR in which, for practical and safety reasons, said side safety barriers 7 or 700 and corresponding side ramps 71 or 701 are desirable

What is claimed is:

1. A transfer device installable on a structure having a floor raised from a ground reference level adapted to facilitate the loading and unloading of a load, the transfer device comprising:

a support structure fixed to the floor;

a platform coupled to the support structure, the platform being movable at least between a deposit position at ground level and an access position at the floor level, the platform transitioning from the deposit to access positions while maintaining substantially horizontal orientation;

at least one actuator operative for moving the platform at least between the deposit and access positions;

at least one side safety barrier coupled to a side of the platform the side safety barrier comprising an articulated quadrilateral having a first arm formed by a corresponding side edge of the platform, an opposed arm constituting a railing of the side barrier and connecting side arms, the side safety barrier being movable between a locked and an unlocked position;

a front safety barrier constrained to the platform and rotatable between a substantially vertical set-up where it serves as a barrier, and a second position where it serves as a ramp;

a first and a second kinematic mechanism, the first kinematic mechanism being coupled to the front safety barrier and the second kinematic mechanism being coupled to the at least one side barrier, the first and second kinematic mechanisms being operative to transition their respective barriers between the locked position when the barrier extends vertically and upwardly from the platform, to the unlocked position where the barrier does not extend above the platform, a slider coupled to at least the first and the second kinematic mechanisms and by contacting the ground when the platform is in the deposit position act on the first and second kinematic mechanisms to transition their respective barriers to an unlocked position.

2. A transfer device as claimed in claim 1, further comprising a second side barrier coupled to the slider by a kinematic mechanism acting to transition the second side barrier between a locked and unlocked positions.

3. A transfer device as claimed in claim 2 wherein the kinematic device acting on the second side barrier is one of the first or the second kinematic devices, or a third kinematic device.

4. A transfer device as claimed n claim 2, wherein the slider comprises at least one wheel.

5. A transfer device as claimed in claim 1, wherein the first and second kinematic mechanisms at least partly coincide with each other.

6. A transfer device as claimed in claim 1, further comprising a side ramp coupled to the railing of the side barrier or integrated therewith wherein the side ramp is rotated downwardly when the respective side barrier is in the unlocked position, to serve as an access ramp to the platform.

7. A transfer device as claimed in claim 1, wherein the platform is coupled to the support structure via a shoulder member, the platform being hinged to the shoulder member.

8. A transfer device as claimed in claim 7, further comprising at least a pair of arms rotatably hinged to the support structure and to the shoulder member, and coupling therebetween such that the support structure and the shoulder form a pair of opposing sides of a parallelogram and the two arms form a second pair of the parallelogram.

9. A transfer device as claimed in claim 7, wherein the platform is foldable to a pre-operating substantially vertical position relative to the floor level.

10. A transfer device as claimed in claim 9 wherein at least the platform is rotatable about the vertical axis.

11. A transfer device as claimed in claim 1 wherein the structure is a vehicle having a floor and front seat or seats, the floor level is the floor of the vehicle, and wherein the transfer device is mounted to the vehicle at a door of the vehicle behind the front seat.

12. A transfer device as claimed in claim 11, wherein at least the platform is rotatable behind the front seat or seats such that it is disposed substantially vertically and parallel to a backrest of the front seat or seats.

13. A transfer device as claimed in claim 1, further comprising a tilting bridge rotatably coupled to the platform and constructed to lie horizontally when the platform is in the access position to bridge between the floor level and the platform.

14. A transfer device as claimed in claim 13 wherein the tilting bridge is further constructed to attain an inclined orientation between the floor level and the platform as the platform transitions to the deposit position.

15. A transfer device as claimed in claim 13 wherein the tilting bridge is lockable at a vertical orientation.

16. A transfer device installable on a structure having a floor raised from a ground reference level adapted to facilitate the loading and unloading of a load, the transfer device comprising:

a support structure fixed to the floor;

A shoulder member;

A pair of arms rotatably hinged to the support structure and to the shoulder member, and coupling therebetween such that the support structure and the shoulder form a pair of opposing sides of a quadrilateral and the two arms form a second pair of the quadrilateral;

a platform coupled to the shoulder, and rotatable from a parallel to substantially orthogonal thereto, the platform and shoulder being movable at least between a deposit position at ground level and an access position at the floor level, the platform transitioning from the deposit to access positions while maintaining substantially horizontal orientation orthogonal to the shoulder;

at least one side safety barrier coupled to a side of the platform the side safety barrier comprising an articulated quadrilateral having a first arm formed by a corresponding side edge of the platform, an opposed arm constituting a railing of the side barrier and connecting side arms, the side barrier being movable between a locked and an unlocked position;

a front safety barrier constrained to the platform, and movable between a locked and an unlocked position;

a first and a second kinematic mechanism, the first kinematic mechanism being coupled to the front safety barrier and the second kinematic mechanism being coupled to the at least one side barrier, the first and second kinematic mechanisms being operative to transition their respective barriers between the locked position when the barrier extends vertically and upwardly from the platform, to the unlocked position where the barrier does not extend above the platform;

a slider coupled to at least the first and the second kinematic mechanisms and by contacting the ground when the platform is in the deposit position act on the first and second kinematic mechanisms to transition their respective barriers to an unlocked position; and at least one actuator operative for moving the platform at least between the deposit and access positions.

17. A transfer device as claimed in claim 16 further comprising a return rod coupling between the pair of arms, and restraining the quadrilateral formed by the arms, structure member and shoulder into a parallelogram.

18. A transfer device as claimed in claim 16 wherein a portion of the side barrier, the front barrier, or both, is constructed to convert to an access ramp between the platform and the ground when the respective barrier is in the unlocked position.

19. A transfer device as claimed in claim 16 wherein the structure is a vehicle having a front seat or seats, a side and a floor, wherein the floor level is the vehicle floor, the transfer device is mounted in the vehicle behind the front seat or seats.

20. A transfer device as claimed in claim 19 wherein at least the platform is rotatable to an orientation orthogonal to the vehicle floor, and parallel to the front seat or seats.

* * * * *